United States Patent [19]

Totschnig

[11] 3,958,838

[45] May 25, 1976

[54] BRAKE PRESSURE LIMITING APPARATUS FOR A DUAL-CIRCUIT VEHICLE BRAKE SYSTEM

[75] Inventor: Manfred Totschnig, Wolfsburg, Germany

[73] Assignee: Volkswagenwerk Aktiengesellschaft, Wolfsburg, Germany

[22] Filed: Jan. 27, 1975

[21] Appl. No.: 544,290

[30] Foreign Application Priority Data

Jan. 28, 1974  Germany............................ 2403855

[52] U.S. Cl................................ 303/22 R; 188/195; 188/349; 303/6 C; 303/84 A
[51] Int. Cl.²........................................... B60T 8/18
[58] Field of Search................ 303/22, 6 C, 6 R, 84, 303/24; 188/195, 151 A, 152, 349

[56] References Cited
UNITED STATES PATENTS

| | | | |
|---|---|---|---|
| 3,101,220 | 8/1963 | Wettstein | 303/22 A |
| 3,578,821 | 5/1971 | Guettier | 303/22 R |
| 3,627,385 | 12/1971 | Stokes | 303/6 C |
| 3,650,571 | 3/1972 | Chouings | 303/22 A X |
| 3,731,981 | 5/1973 | Bueler | 303/22 R |
| 3,762,776 | 10/1973 | Kawabe et al. | 188/195 X |

FOREIGN PATENTS OR APPLICATIONS

| | | | |
|---|---|---|---|
| 1,087,023 | 8/1960 | Germany | 303/22 R |
| 2,106,849 | 8/1971 | Germany | 303/22 R |

*Primary Examiner*—Duane A. Reger
*Assistant Examiner*—Douglas C. Butler
*Attorney, Agent, or Firm*—Brumbaugh, Graves, Donohue & Raymond

[57] ABSTRACT

A brake pressure limiting device is disclosed for use in a dual-circuit vehicle brake system. The device comprises two valve bodies arranged on a common axis. Each valve body has one inlet for connection with a master brake cylinder and at least one brake line outlet. The pressure at the outlet can be isolated from that at the inlet by a valve element which is axially movable within the valve body between an open and a closed position. Movement of both valve elements in the two valve bodies is controlled by a common actuating member which causes the valve elements to close when the pressures at the valve body inlets exceed a limiting value that is a function of the vehicle load.

7 Claims, 3 Drawing Figures

BRAKE PRESSURE LIMITING APPARATUS FOR A DUAL-CIRCUIT VEHICLE BRAKE SYSTEM

BACKGROUND OF THE INVENTION

The present invention concerns a brake pressure limiting device for a dual-circuit vehicle brake system. More particularly, the invention concerns a device of this type which incorporates two equi-axially arranged valve bodies each having one inlet adapted for connection with a master brake cylinder and at least one outlet adapted for connection with a vehicle brake line. An axially displaceable valve element is disposed within each valve body and arranged to move between an open position, in which the pressure at the valve body inlet is transmitted to the outlet, and a closed position isolating the pressures at the inlet and outlet. The pressure limitation effected by closing of the two valve elements is controlled by a common actuating member as a function of the vehicle load.

In a known brake pressure limiting device which is disclosed in the West German Offenlegungschrift No. 1,915,485 one valve body is inserted inside another and the two are closely connected with each other. A valve element is supported within each of these valve bodies and arranged to move linearly along a common longitudinal axis. A load-dependent actuating member is arranged to apply a force at the free end of one of the valve bodies. This force acts by way of a pressure member on the valve element within this valve body ("first valve element"), and presses it back in the direction of opening. As this valve element is pushed back by the pressure element, it in turn presses back on a shaft of the valve element in the adjacent valve body ("second valve element") so that this second element is also opened. When the two valves are open, the pressures at the inlets in the two valve bodies, which are connected with the master brake cylinder, determine the pressures at the associated valve body outlets that are connected, via brake lines, to the wheel brake cylinders As is well known, the pressure delivered by the master brake cylinder is increased when the brake is actuated. When this pressure attains a value which, when multiplied by the effective surface area of the valve, corresponds to the force of the actuating member, the first valve element in the valve body pushes back on the pressure element, and thus on the actuating member, and closes again. The second valve element in the adjacent valve body is subject to two equal pressure forces in opposition. A special spring within this valve body takes care that this valve is then also closed.

The two valve elements are designed in such a manner that a small clearance remains between them when they are in the closed position.

When the pressure determined by the master brake cylinder drops, the actuating member again pushes back on the first valve element of the valve body so that this first element is thereby opened. As a result, the pressure connection between the master brake cylinder and the associated brake line is restored. The second valve element of the adjacent valve body is opened only somewhat later than the first since the play between the two valve elements and the spring force acting on the second valve element must first be overcome. Consequently, as may be seen, there exists by necessity a certain asymmetry in the response of the two valves.

SUMMARY OF THE INVENTION

An object of the present invention is to improve a brake pressure limiting device of the above-described type so that the valve elements associated with the two brake circuits respond at the same pressure values.

This object, as well as other objects which will become apparent in the discussion that follows, are achieved, in accordance with the present invention, by arranging the actuating member between the two valve bodies so as to act simultaneously on the valve elements of these valve bodies.

In a preferred embodiment of the present invention the actuating member includes a pressure chamber, having a pressure inlet opening adapted for connection with a vehicle load-dependent pressure source, and two facing axially displaceable pistons, each of which is operative to move of the valve elements in dependence upon the pressure in the chamber.

Preferably, a prestressed spring is arranged in the pressure chamber to push the two pistons apart.

The brake pressure limiting device according to the present invention may be incorporated into any dual-circuit brake system known in the art. According to a further development of the invention, however, the brake pressure limiting device is employed in a brake system having a load-dependent brake force distributor connected to supply the brake pressure to the vehicle rear wheel brakes. In a first preferred embodiment of such a brake system the brake force distributor is of the type which reduces the braking pressure, and in a second embodiment the brake force distributor is of the type which limits the braking pressure in dependence upon the vehicle load.

In the first embodiment of the vehicle brake system, the brake pressure limiting device according to the invention is provided with two outlets as well as one inlet in each valve body. One of the outlets in each valve body is connected to a front wheel brake of the vehicle. The inlet of each valve body is connected to a separate master brake cylinder.

The brake system according to this embodiment also includes a brake pressure reducing, load-dependent brake force distributor comprising two chambers, each chamber having an inlet and an outlet. the outlet of each chamber is connected to a rear wheel brake, while the inlet of each chamber is connected to the remaining outlet in each valve body of the brake pressure limiting device. Finally, one of the chamber outlets of the brake force distributor is connected to the pressure chamber inlet of the brake pressure limiting device.

In the second embodiment of a vehicle brake system incorporating the brake pressure limiting device according to the present invention, a brake pressure limiting, load-dependent brake force distributor is employed to supply the brake pressure to the vehicle rear wheel brakes. In this case, each chamber inlet of the brake force distributor is connected directly to a separate master brake cylinder. The brake pressure limiting device is provided with only one outlet in each valve body, such outlets being connected with the vehicle front wheel brakes. As in the first embodiment, the pressure chamber of the brake pressure limiting device receives pressure from one of the chamber outlets of the brake force distributor.

DESCRIPTION OF THE PREFERRED EMBODIMENTS

The preferred embodiments of the present invention will now be described with reference to FIGS. 1–3 of the drawings.

Figure 1:
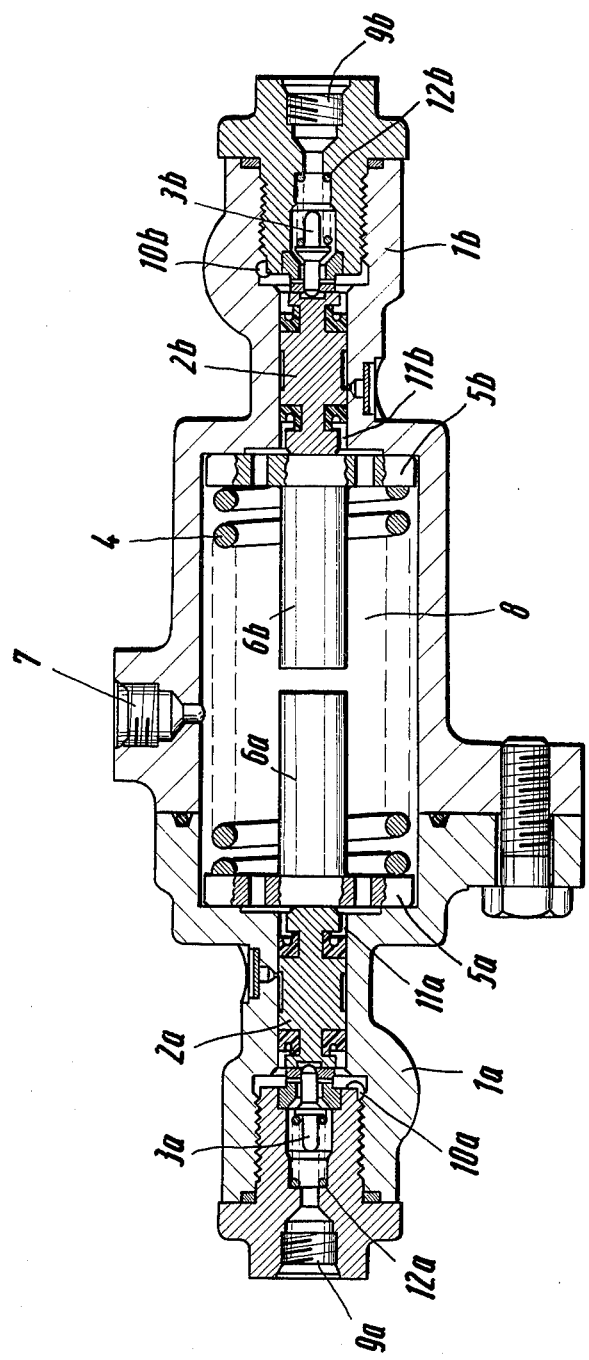
FIG. 1 is a cross-sectional view of a brake pressure limiting device according to a preferred embodiment of the present invention.

In the embodiment shown in FIG. 1, the brake pressure limiting device according to the present invention comprises two valve bodies 1a and 1b and a chamber 8 disposed between them. The two valve bodies 1a, 1b and the chamber 8 are all arranged on a common axis. Each of the valve bodies 1a and 1b is provided with an inlet opening 9a and 9b, respectively, adapted for connection with a separate master brake cylinder I and II, respectively, in a dual-circuit brake system (FIGS. 2 and 3). Each valve body 1a and 1b is also provided with at least one outlet opening 10a and 10b, respectively, adapted for connection via a brake line to an associated wheel brake cylinder. The inlet openings 9a and 9b can be isolated pressure-wise from these respective brake line outlet openings 10a and 10b by an associated valve element 3a and 3b arranged to be axially displaceable within the valve bodies. Upon closure of the valve element 3a or 3b within its corresponding valve body 1a or 1b, the pressure at the inlet opening 9a or 9b may rise without increasing the pressure at the associated brake line outlet opening 10a or 10b.

The pressure value at which the valves 3a and 3b close — i.e., the value to which the outlet pressure is limited — can be adjusted by means of the chamber 8 that serves as a pressure chamber. For this purpose the pressure chamber 8 is provided with a pressure inlet opening 7 adapted to be connected with a vehicle load-dependent pressure source. Two facing pressure exit openings 11a and 11b are connected pressure-wise over axially displaceable pistons 2a and 2b, respectively, with associated valve elements 3a and 3b in the valve bodies 1a and 1b. Finally, there is arranged inside the pressure chamber 8 is pretensioned spring 4 which pushes apart the two pistons 2a and 2b. The spring pressure of the spring 4 is transmitted over axially displaceable intermediate members 5a and 5b to the two pistons 2a and 2b, respectively. The intermediate members 5a and 5b each have a rigid stop 6a, 6b on the sides thereof facing away from the pistons 2a and 2b, respectively, to prevent the spring 4 from being overstressed — e.g., when the valve elements 3a and 3b are worn into their seats.

The pressure limiting point of the two valve elements 3a and 3b is determined by the pretension of the spring 4 as well as the control pressure prescribed by the vehicle load-dependent pressure source. Since the force of the spring 4 and the control pressure act on both of the pistons 2a and 2b simultaneously and equally, the brake pressure limiting device according to the present invention precisely synchronizes the pressure limiting points of the valve elements 3a and 3b. An accurate setting of the spring tension is not necessary because the important aspect is not the precise magnitude of the pressure limiting point but the equality of this value for both brake circuits. However, it is possible to vary the spring pretension as desired in a simple manner by inserting spacers between the spring 4 and the intermediate members 5a and 5b, respectively.

The spring pretension of the spring 4 determines the brake pressure limiting point for an empty vehicle. A vehicle load-dependent pressure source connected at the pressure inlet opening 7 of the pressure chamber 8 displaces the pressure limiting point as a function of the vehicle load.

The brake pressure limiting device in accordance with the present invention operates as follows:

The pistons 2a and 2b, respectively, are pressed into their respective valve bodies 1a and 1b with a force determined by the spring 4 and, in some cases, by the control pressure supplied at the inlet 7. As a result, the valve elements 3a and 3b are lifted from their valve seats (not indicated) and thereby opened. This means that a pressure connection is present between the inlet openings 9a and 9b, connected with the master brake cylinders, and the brake line outlet openings 10a and 10b, respectively, connected with the wheel brake cylinders. If any additional brake line outlet openings (not indicated) are present, pressure is also supplied thereto from the inlet openings.

Under the above conditions with the valve elements 3a and 3b open, the pressure at the brake line outlet openings 10a and 10b corresponds to the pressure at the respective inlet openings 9a and 9b so that an increase or decrease in pressure at the inlet openings results in a corresponding pressure modification at the brake line outlet openings. However, as soon as the valve elements 3a and 3b close, the inlet openings and the brake line outlet openings are decoupled. This occurs whenever the force acting on the sides of the pistons 2a and 2b facing the respective valve elements 3a and 3b becomes larger than the force acting on the sides of the pistons 2a and 2b facing the chamber 8. The force acting on the sides facing the value elements is dependent upon the area of the effective piston surfaces and the magnitude of the pressure exerted on them. Correspondingly, the force acting on the sides of the pistons facing the chamber 8 is equal to the sum of the force of the spring 4 and the force resulting from the pressure prevailing in the chamber 8 acting on the effective piston surfaces. As soon as the force prevailing on the valve sides of the pistons 2a and 2b, respectively, becomes larger than the force on the chamber sides, the pistons are pushed toward the chamber 8 so that the valve elements 3a and 3b close under the action of small valve springs 12a and 12b, respectively. If the brake pressure prevailing at the two inlet openings 9a and 9b is equally high, the valves 3a and 3b will close at precisely the same time.

The pressure inlet opening 7 of the chamber 8 can be connected, in principle, with any vehicle load-dependent pressure source. For example, it is possible to arrange a hydraulic piston-cylinder unit between the vehicle body and the vehicle axle. The chamber volume of such a unit will be reduced as a function of the vehicle load so that the pressure within the chamber will increase accordingly as the load increases. A reduction in load will result in an increase in chamber volume and a corresponding decrease in pressure.

Figure 2:
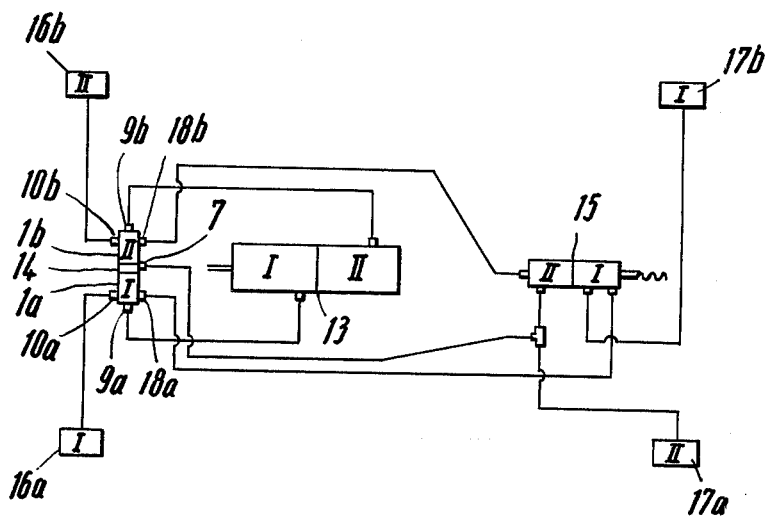
FIG. 2 is a schematic diagram of a dual-circuit brake system comprising a brake pressure limiting device, according to the present invention, for limiting the brake pressure at the front wheel brakes of a vehicle and a brake pressure reducing, load-dependent brake force distributor having two chambers for supplying brake pressure to the rear wheel brakes of the vehicle.
Figure 3:
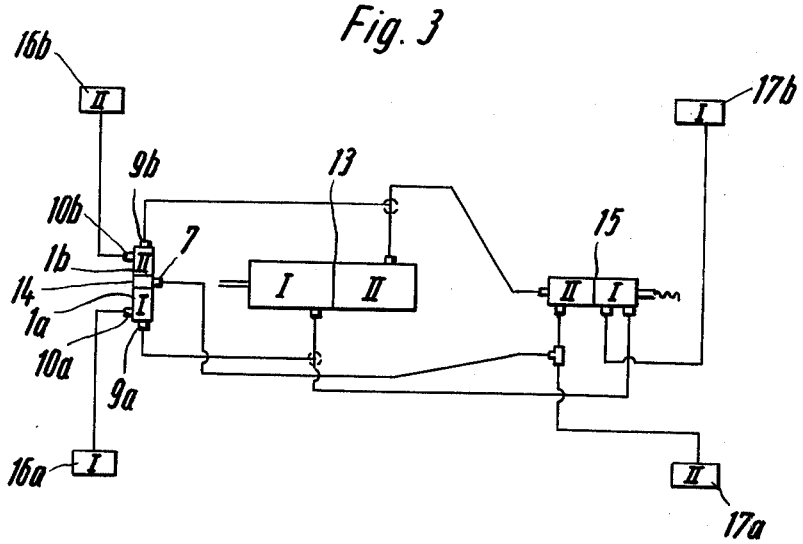
FIG. 3 is a schematic diagram of a dual-circuit brake system comprising a brake pressure limiting device, according to the present invention, for limiting the brake pressure at the front wheel brakes of a vehicle and a brake pressure limiting, load-dependent brake force distributor having two chambers for supplying brake pressure to the rear wheel brakes of the vehicle.

FIGS. 2 and 3 illustrate preferred embodiments of two brake systems incorporating the brake pressure limiting device in accordance with the present invention. Both brake systems are so-called "dual-circuit" systems having a tandem master brake cylinder and diagonally divided brake circuits. In both systems the brake pressure limiting device according to the present invention serves to limit the brake pressure on the front wheel brakes of the vehicle, the rear wheel brakes being actuated by way of a load-dependent brake force distributor. The system of FIG. 2 is provided with a brake force distributor which reduces the braking pressure, whereas the system in FIG. 3 employs a brake force distributor that limits the braking pressure. Brake force distributors of suitable type are well known in the art and are disclosed, for example, in the U.S. Pat. No. 3.762.776 and in the West German Offenlegungsschrift 1,920,739.

Load-dependent brake pressure limitation for the front wheel brakes of a vehicle is necessary especially if the center of gravity of the vehicle, when empty, is at such an unfavorable point relative to the front axle that the rear of the vehicle is raised off the road when the brakes are firmly applied. Such a lifting of the vehicle rear, which can be referred to as the "nose-over effect", leads to an uncontrollable swerving of the vehicle and, in the worst case, can result in the vehicle actually turning-over. By employment of a brake pressure limiting device in accordance with the present invention in such a manner as to limit the brake pressure at the front wheel brakes, it is ensured that the front brakes will at all times be actuated with only such brake pressure as will safely avoid the nose-over effect. the pressure limiting point of the brake pressure limiting device for the front wheel brakes must not be unchangeably fixed, however, because the required and the maximally admissible brake pressure varies with the load condition of the vehicle. Accordingly, it is necessary for the pressure limiting point to be modified as a function of vehicle load. Moreover, it is required that the pressure limiting point be the same for both braking circuits in order that the vehicle, when braked, will not pull to the right or left. The brake pressure limiting device according to the present invention fulfills these requirements.

It is generally customary to employ a brake force distributor to distribute the brake pressure between the front and the rear wheel brakes of a vehicle in such a manner that the rear wheels, which are relieved when braking, do not lock or skid before the front wheels. Towards this end, a brake force distributor is inserted in the brake pressure line leading to the rear wheels. This brake force distributor may be either a brake pressure reducer to a brake pressure limiter so that the brake pressure delivered to the rear wheel brakes is decreased or limited, respectively. In either case, the pressure at the outlet of such a brake force distributor is dependent upon the vehicle load.

In the event that the brake pressure limiting device in accordance with the present invention is used to limit the brake pressure at the front wheel brakes of a vehicle, the rear wheel brakes of which are actuated by means of a load-dependent brake force distributor, the brake force distributor may be employed in accordance with the present invention as a load-dependent source of pressure for the brake pressure limiting device. FIG. 2 shows and arrangement of this kind having a brake force distributor operative to reduce the brake pressure. As is well known the hydraulic pressure at the outlet of a brake pressure reducing brake force distributor increases — above a determined, preferably load dependent value — less than the hydraulic pressure at the inlet of said distributor. The structure and operation of a brake force distributor of suitable type is well known to those skilled in the art and is disclosed, for example, in the U.S. Pat. Nos. 3,762,776 and 3,627,385, the first patent showing a load-dependent brake pressure reducing distributor and the second patent showing a brake pressure reducing distributor for use in a dual-circuit vehicle brake system. The two brake circuits are divided diagonally, the elements pertaining to each being uniformly designated by I and II, respectively. A master brake cylinder 13 is constructed as a tandem cylinder with separate chambers I and II. The chamber I of the master cylinder 13 is connected with the inlet opening 9a and the chamber II of the master cylinder is connected with the inlet opening 9b of the brake pressure limiting device 14 The two valve bodies of the brake pressure limiting device 14 are each provided with two brake line outlets. The first brake line outlet 10a of the valve body 1a associated with the brake circuit I is connected to one front wheel brake 16a while the first brake line outlet 10b of the valve body 1b associated with the brake circuit II is connected with the other front wheel brake 16b. The second brake line outlet 18a of the valve body 1a (not shown in FIG. 1) is connected with the inlet of the chamber I of the brake force distributor 15, whereas the second brake line outlet 18b of the valve body 1b is connected with the inlet of the chamber II of the brake force distributor. The pressure inlet opening 7 of the brake pressure limiting device 14 is connected to one of the outlets of the brake force distributor 15.

As may be seen, this arrangement in accordance with the present invention ensures that the pressure supplied to the brake force distributor 15 for the rear axle never exceeds the limited pressure of the front axle which, in turn, ensures that the brake pressure delivered to the rear wheel brakes 17a and 17b will be less than the brake pressure delivered to the front wheel brakes 16a and 16b.

If the brake force distributor 15 for the rear axle comprises a load-dependent pressure limiting device, the latter can be directly connected to the master brake cylinder 13. An arrangement of this type is shown in FIG. 3. As is well known the hydraulic pressure at the outlet of a brake pressure limiting brake force distributor remains — above a determined, preferably load dependent value of the inlet pressure — at least approximately constant independent of a further increase of the pressure at the inlet of the distributor. The structure and operation of a brake force distributor of suitable type is disclosed, for example, in the U.S. Pat. No. 3,578,821. In this case, the valve bodies 1a and 1b of the brake pressure limiting device 14 need be provided with only one brake line outlet 10a and 10b, respectively, because the inlets to the chambers I and II of the brake force distributor 15 are no longer connected with the brake pressure limiting device 14. With a suitable setting of the pressure limiting points of the brake force distributor 15 and the brake pressure limiting device 14, this arrangement of FIG. 3 also ensures that the brake pressure delivered to the rear wheel brakes 17a and 17b never exceeds the brake pressure supplied to the front wheel brakes 16a and 16b.

The pressure inlet opening 7 of the brake pressure limiting device 14 in the systems of FIGS. 2 and 3 is connected with one of the outlets of the brake force distributor 15. In the event that the brake circuit supplying the control pressure for the brake pressure limiting device should fail, the pressure limiting point for the remaining brake circuit would no longer be load-dependent. In this case, however, a fixed point of limitation would be maintained by the pretensioned pressure spring 4. Since the legal minimum requirements for the performance of a vehicle brake system on breakdown of a braking circuit are substantially lower than the performance of the present system, these standards are met, even for a fully loaded vehicle, through the limited pressure.

It is preferred that the brake pressure limiting valves for the front axle be structurally separate from the brake force distributor for the rear axle. In principle, however, it is feasible to combine both units into one housing although such an arrangement would require a larger outlay for the system of brake lines.

It will be understood that the present invention is susceptible to various modifications, changes and adaptations which fall within its spirit and scope. Accordingly, it is intended that the present invention be limited only by the following claims and their equivalents.

I claim:

1. Brake pressure limiting apparatus for a dual-circuit vehicle brake system comprising, in combination:
   a. a first and a second valve body arranged on a common axis;
   b. the first valve body having a first inlet adapted for connection with a master cylinder and at least one first outlet for supplying braking pressure in said brake system;
   c. the second valve body having a second inlet adapted for connection with a master cylinder and at least one second outlet for supplying braking pressure in said brake system;
   d. a first valve element arranged within said first valve body, said first valve element being movable along said common axis between an open position, in which the pressure at said first inlet is transmitted to said first outlet, and a closed position isolating the pressures at said first inlet and first outlet;
   e. a second valve element arranged within said second valve body, said second valve element being movable along said common axis between an open position, in which the pressure at said second inlet is transmitted to said second outlet, and a closed position isolating the pressures at said second inlet and second outlet; and
   f. common actuating means, arranged between said first and second valve bodies, for simultaneously and equally applying an actuating force to said first and second valve element causing said first and second valve element to close when the pressure at said first and second inlets, respectively, exceeds a limiting value that is dependent upon the vehicle load.

2. The brake pressure limiting apparatus defined in claim 1, wherein said common actuating means includes:
   1. a pressure chamber having a third inlet adapted for connection with a vehicle load-dependent source of pressure;
   2. first axially displaceable piston means, arranged between said chamber and said first valve element, for moving said first valve element in dependence upon the pressure within said chamber; and
   3. second axially displaceable piston means, arranged between said chamber and said second valve element, for moving said second valve element in dependence upon the pressure within said chamber.

3. The brake pressure limiting apparatus defined in claim 2, wherein said common actuating means further includes pretensioned spring means, arranged in said chamber, for pushing apart said first and second piston means.

4. The brake pressure limiting apparatus defined in claim 3, wherein said common actuating means further includes a first and a second intermediate member arranged between said spring means and said first and said second piston means, respectively, said first and second intermediate members being axially displaceable within said chamber.

5. The brake pressure limiting apparatus defined in claim 4, wherein said first and said second intermediate members have rigid stop means on their sides facing away from said first and said second piston means, respectively, for limiting the movement of said intermediate members in the directions tending to tension said spring means.

6. A vehicle brake system comprising, in combination:
   a. the brake pressure limiting apparatus defined in claim 2, said at least one first outlet including two first outlets and said at least one second outlet including two second outlets;
   b. a brake pressure reducing, load-dependent brake force distributor comprising two chambers, each chamber having an inlet and an outlet;
   c. a first front wheel brake connected to one of said first outlets of said brake pressure limiting apparatus and a second front wheel brake connected to one of said second outlets of said brake pressure limiting apparatus;
   d. a first rear wheel brake connected to one chamber outlet of said brake force distributor and a second rear wheel brake connected to the other chamber outlet of said brake force distributor;
   e. means connecting said third inlet of said brake pressure limiting apparatus with one of said chamber outlets of said brake force distributor;
   f. means connecting the other of said first outlets of said brake pressure limiting apparatus with one chamber inlet of said brake force distributor; and
   g. means connecting the other of said second outlets of said brake pressure limiting apparatus with the other chamber inlet of said brake force distributor.

7. A vehicle brake system comprising, in combination:
   a. the brake pressure limiting apparatus defined in claim 2, having one first outlet and one second outlet;
   b. a brake pressure limiting, load-dependent brake force distributor comprising two chambers, each chamber having an inlet, adapted for connection to a master brake cylinder, and an outlet;
c. a first front wheel brake connected to said first outlet of said brake pressure limiting apparatus and a second front wheel brake connected to said second outlet of said brake pressure limiting apparatus;
d. a first rear wheel brake connected to one chamber outlet of said brake force distributor, and a second rear wheel brake connected to the other chamber outlet of said brake force distributor; and
e. means connecting said third inlet of said brake pressure limiting apparatus with one of said chamber outlets of said brake force distributor.

* * * * *